(12) United States Patent
Amodeo

(10) Patent No.: US 11,148,329 B2
(45) Date of Patent: Oct. 19, 2021

(54) FOAMING APPARATUS FOR REFRIGERATOR CABINETS AND RELATED FOAMING METHOD

(71) Applicant: KRAUSSMAFFEI TECHNOLOGIES GMBH, Munich (DE)

(72) Inventor: Gabriele Amodeo, Ozzero (IT)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 483 days.

(21) Appl. No.: 15/575,762

(22) PCT Filed: May 18, 2016

(86) PCT No.: PCT/EP2016/061079
§ 371 (c)(1),
(2) Date: Nov. 20, 2017

(87) PCT Pub. No.: WO2016/192991
PCT Pub. Date: Dec. 8, 2016

(65) Prior Publication Data
US 2018/0133937 A1 May 17, 2018

(30) Foreign Application Priority Data
May 29, 2015 (IT) .................. 102015000019454

(51) Int. Cl.
*B29C 33/20* (2006.01)
*B29C 44/42* (2006.01)
(Continued)

(52) U.S. Cl.
CPC ............ *B29C 44/428* (2013.01); *B29C 33/20* (2013.01); *B29C 44/1233* (2013.01);
(Continued)

(58) Field of Classification Search
CPC ......... B29L 2031/7622; B29C 44/1233; B29C 44/3403; B29C 44/353
See application file for complete search history.

(56) References Cited

U.S. PATENT DOCUMENTS 4,090,837 A     5/1978 Balevski et al.
4,765,935 A *   8/1988 Fiorentini ............... B29C 44/60
                                                    264/261
(Continued)

FOREIGN PATENT DOCUMENTS

WO    WO 2015/032908       3/2015

OTHER PUBLICATIONS

International Search Report dated Jul. 25, 2016 by the European Patent Office in International Application PCT/EP2016/061079.

*Primary Examiner* — Alison L Hindenlang
*Assistant Examiner* — Debjani Roy
(74) *Attorney, Agent, or Firm* — Henry M. Feiereisen LLC

(57) ABSTRACT

A foaming apparatus for foaming a refrigerator cabinet includes a frame including a supporting structure, and first and second foaming jigs restrained to the supporting structure opposite to each other relative to the supporting structure. The first and second foaming jigs being respectively arranged in a lower position and in an upper position relative to a vertical direction of the foaming apparatus in an operating condition thereof. Each foaming jig includes a bottom wall, peripheral walls configured to enclose an outer shell of the refrigerator cabinet, a plug configured to engage an inner shell of the refrigerator cabinet, and at least one injection head configured to carry out injection of a foaming mixture into the refrigerator cabinet received therein. The (Continued)

peripheral walls and the plug are restrained to the supporting structure, whereas the bottom wall is removably mounted to the peripheral walls.

12 Claims, 7 Drawing Sheets

(51) Int. Cl.
  *B29C 44/12* (2006.01)
  *B29K 75/00* (2006.01)
  *B29L 31/00* (2006.01)
  *F25D 23/06* (2006.01)

(52) U.S. Cl.
  CPC ... *B29K 2075/00* (2013.01); *B29L 2031/7622* (2013.01); *F25D 23/065* (2013.01); *F25D 2201/126* (2013.01)

(56) References Cited

U.S. PATENT DOCUMENTS

| | | | |
|---|---|---|---|
| 5,773,049 A | 6/1998 | Kashiwa et al. | |
| 2008/0029921 A1* | 2/2008 | Corradi | B29C 44/3403 264/51 |
| 2011/0260351 A1* | 10/2011 | Corradi | B29C 44/428 264/40.1 |
| 2012/0093959 A1* | 4/2012 | De Rossi | B29C 44/3403 425/4 R |

\* cited by examiner

FOAMING APPARATUS FOR REFRIGERATOR CABINETS AND RELATED FOAMING METHOD

CROSS-REFERENCES TO RELATED APPLICATIONS

This application is the U.S. National Stage of International Application No. PCT/EP2016/061079, filed May 18, 2016, which designated the United States and has been published as International Publication No. WO 2016/192991 and which claims the priority of Italian Patent Application, Serial No. 102015000019454, filed May 29, 2015, pursuant to 35 U.S.C. 119(a)-(d).

BACKGROUND OF THE INVENTION

The present invention generally relates to the foaming of refrigerators, freezers and the like, and in particular to an apparatus and a method for the foaming of refrigerator cabinets.

A refrigerator cabinet is generally made up of an outer shell and an inner shell between which a cavity suitable to be filled with an insulating foam is formed. Foaming of refrigerator cabinets is performed in suitable foaming apparatuses by injecting a foaming mixture into their cavities, for example a mixture based on a polyol and an isocyanate to form a polyurethane foam by curing.

To this aim, a foaming apparatus for refrigerator cabinets is provided with a jig comprising a bottom wall and a number of peripheral walls configured to enclose the outer shell of a cabinet, as well as a plug configured to engage its inner shell. The plug is shaped so as to match the shape of the inner shell of the cabinet. The bottom and peripheral walls and the plug of the jig are intended to counteract the pressure generated by the expansion of the insulating foam during its curing process.

US 2008/0029921 A1 discloses an example of a foaming apparatus of this type, comprising a first and at least a second foaming jigs rotatably mounted on a supporting frame. The jigs may be selectively moved along a circular path from a injecting position, wherein a cabinet to be processed is received in one between the first and the second jig and subjected to a step of injecting a foaming mixture, to a curing position, wherein the cabinet filled with the foaming mixture is left to cure for a predefined time. During the curing step, another cabinet may be received in the other one between the first and the second jig, subjected to the step of injecting a foaming mixture and then rotated into the curing position. The cabinet previously processed is thus brought back to the injecting position and may be discharged so as to make room for a new cabinet to be processed.

It is known that, depending on the specific design of the cavity, foaming may be carried out by arranging a refrigerator cabinet either in a "bell configuration", or in a "bath configuration". In the bell configuration a cabinet is arranged with the cavity facing downwards relative to a vertical direction and the foaming mixture is injected by way of one or more injection heads arranged above the jig, whereas in the bath configuration a cabinet is arranged with the cavity facing upwards relative to a vertical direction and the foaming mixture is injected by way of one or more injection heads arranged under the jig.

In order to carry out foaming of refrigerator cabinets either in a bell or in a bath configuration, respective independent manufacturing lines are generally needed, which results in high apparatus and manufacturing costs. Alternatively, it is possible to completely change the set-up of a same foaming apparatus from a bell to a bath configuration or vice versa depending on the type of refrigerator cabinet, which is time consuming, requires to fully stop a foaming apparatus and thus a whole manufacturing line and therefore has a negative impact on the manufacturing costs.

SUMMARY OF THE INVENTION

A need therefore exists to improve existing foaming apparatuses and to provide a foaming apparatus for refrigerator cabinets allowing to carry out foaming according to either a bell configuration or a bath configuration, which is an object of the present invention.

According to one aspect of the invention, the object is achieved by a foaming apparatus for the foaming of refrigerator cabinets, the foaming apparatus including a frame having a supporting structure to which at least a first and a second foaming jig are restrained opposite to each other relative to said supporting structure, the foaming jigs being respectively arranged in a lower position and in an upper position relative to a vertical direction of the apparatus in an operating condition thereof, wherein each foaming jig includes a bottom wall and peripheral walls configured to enclose the outer shell of a refrigerator cabinet, as well as a plug configured to engage the inner shell of the cabinet, and wherein the peripheral walls and the plug are restrained to the supporting structure, whereas the bottom wall is removably mounted to the peripheral walls, wherein every jig also includes one or more injection heads configured to carry out injection of a foaming mixture into a refrigerator cabinet received therein.

According to another aspect of the invention, the object is achieved by a method of foaming refrigerator cabinets in a foaming apparatus of the type as set forth above, the method including:

i) providing each jig with one or more injection heads configured to carry out injection of a foaming mixture into a refrigerator cabinet received therein, ii) receiving a refrigerator cabinet in any one of the jigs, iii) bringing the jig with said refrigerator cabinet to the lower position or upper position, iv) injecting a foaming mixture into a cavity of the refrigerator cabinet.

Other features are disclosed in the remaining claims.

The foaming apparatus according to the invention comprises at least two independent foaming stations having respective jigs and injection heads allowing to process refrigerator cabinets either in a bath position or in a bell position according to their specific manufacturing needs.

Processing of cabinets, i.e. injecting and/or curing of a foaming mixture, may occur in either foaming station and even simultaneously in the two foaming stations, thus allowing to optimize processing times and manufacturing costs.

Processing of different types of refrigerator cabinets is thus also advantageously possible.

BRIEF DESCRIPTION OF THE DRAWING

Further advantages and features of the foaming apparatus and method according to the present invention will become clear to those skilled in the art from the following detailed and non-limiting description of embodiments thereof with reference to the attached drawings, wherein.

DETAILED DESCRIPTION OF PREFERRED EMBODIMENTS

Figure 1:
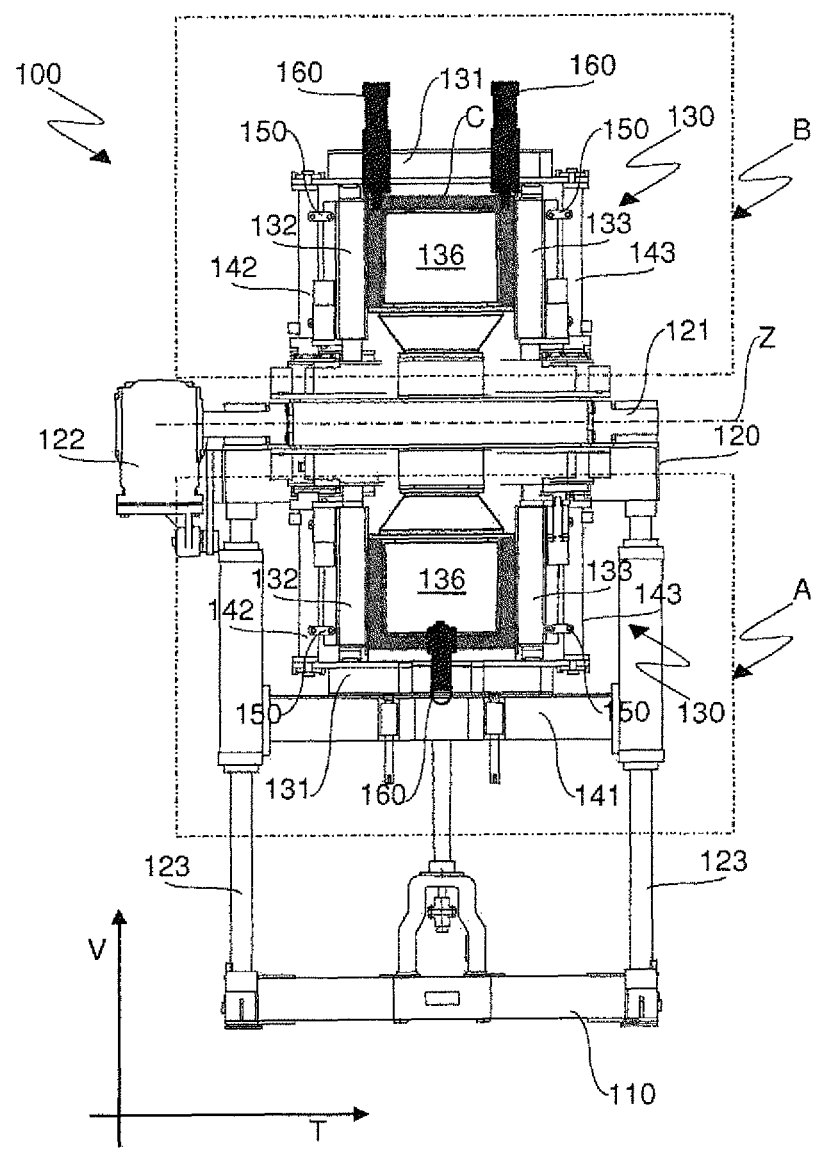
FIG. 1 is a front view schematically showing a foaming apparatus according to the invention in an operating condition.
Figure 2:
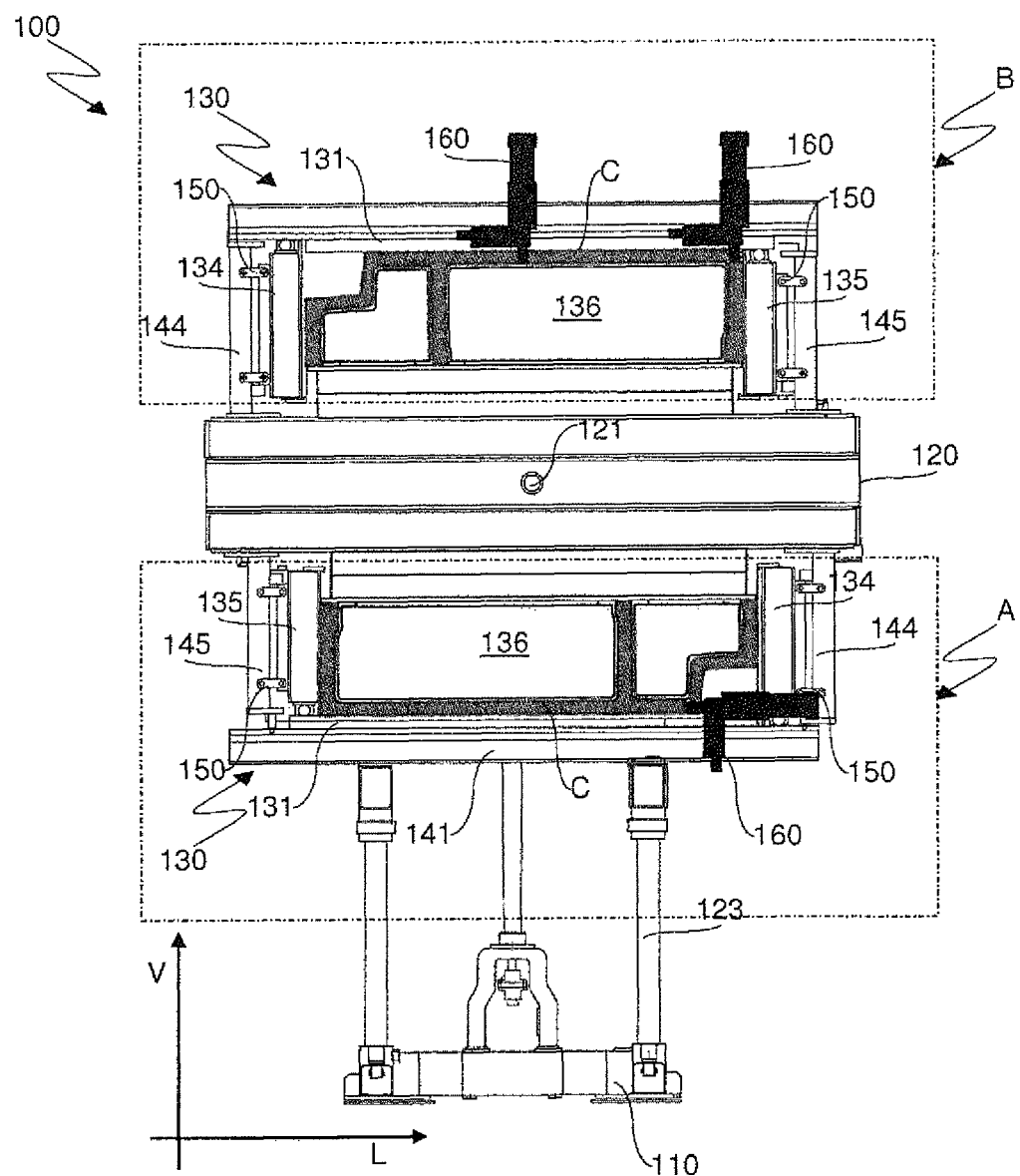
FIG. 2 is a side view of the foaming apparatus of FIG. 1.

Referring to FIGS. 1 and 2, a foaming apparatus according to the invention is generally indicated by reference numeral 100 and shown in a three dimensional reference system, wherein a base 110 stretches out along mutually perpendicular longitudinal and transverse directions L, T and a frame 120 extends from the base 110 in a vertical direction V, perpendicular to the longitudinal and transverse directions L, T.

The frame 120 comprises a supporting structure 121 to which a first and a second foaming jigs 130 are restrained. The first and second foaming jigs are arranged opposite to each other relative to the supporting structure 121.

In an operating condition of the foaming apparatus as shown in FIGS. 1 and 2, the first and second jigs 130 are respectively arranged in a lower position A and in an upper position B of the foaming apparatus 100 relative to the vertical direction V. The lower position A is located between the supporting structure 121 and the base 110 of the apparatus, whereas the upper position B is located opposite to the lower position A in the vertical direction V relative to the supporting structure 121. Both positions A, B are schematically indicated in FIGS. 1 and 2 by rectangular frames in broken lines.

Each foaming jig 130 comprises a bottom wall 131 and a plurality of peripheral walls, e.g. four walls 132, 133, 134, 135, configured to enclose the outer shell of a refrigerator cabinet C, as well as a plug 136 configured to engage the inner shell of the cabinet C.

The shape of the plug 136 is configured so as to match the shape of the inner shell of the cabinet C. The bottom and peripheral walls 131, 132, 133, 134, 135 and the plug 136 of the jig are intended to counteract the pressure generated by the expansion of the insulating foam during its curing process.

The peripheral walls 132, 133, 134, 135 and the plug 136 of the jig 130 are restrained to the supporting structure 121 of the foaming apparatus 100, whereas the bottom wall 131 is removably mounted to the peripheral walls 132, 133, 134, 135 so as to allow to place or load a cabinet C to be processed into any one of the jigs 130.

Hence, the peripheral walls 132, 133, 134, 135 and the plug 136 of the jig 130 arranged in the lower position A face the base 110 of the apparatus 100, whereas the peripheral walls 132, 133, 134, 135 and the plug 136 of the jig 130 arranged in the upper position B face upwards in the vertical direction V.

In the embodiment shown in the drawings, the supporting structure 121 is a rotatable shaft restrained to the frame 120 so as to rotate about a horizontal axis Z. This axis e.g. extends in the transverse direction T of the foaming apparatus 100. The rotatable shaft 121 might alternatively be restrained to the frame 120 so as to rotate about a horizontal axis extending in the longitudinal direction L of the foaming apparatus 100.

Rotation of the shaft 121 is e.g. driven by a gearmotor 122 of the apparatus 100. This configuration of the apparatus allows to load a refrigerator cabinet C to be treated and unload it after the foaming process at the lower position of the apparatus, as it will be explained in the following with reference to FIGS. 3 to 6.

In order to allow loading of a refrigerator cabinet C into a jig 130, the bottom wall 131 must be detached from the peripheral walls 132, 133, 134, 135 and moved away therefrom.

According to embodiment shown in the drawings, one between the first and the second jigs 130, e.g. the first jig, is brought in the lower position A by rotating the shaft 121. The foaming apparatus 100 comprises a platform 141 arranged between the jig 130 and the base 110 and movable relative thereto along the vertical direction V.

The movable platform 141 is e.g. restrained to a plurality of mounts 123 of the frame 120 of the apparatus 100, stretching out from the base 110 in the vertical direction V. Driving of the movable platform 141 along the vertical direction V may be achieved by any known means such as e.g. hydraulic, electric, mechanic actuators or combinations thereof.

The movable platform 141 is brought in contact with the bottom wall 131 of the jig 130 in the lower position A. The bottom wall 131 is disengaged from the peripheral walls 132, 133, 134, 135 and then lowered together with the platform 141 along the vertical direction V thus allowing to open the jig 130.

Figure 3:
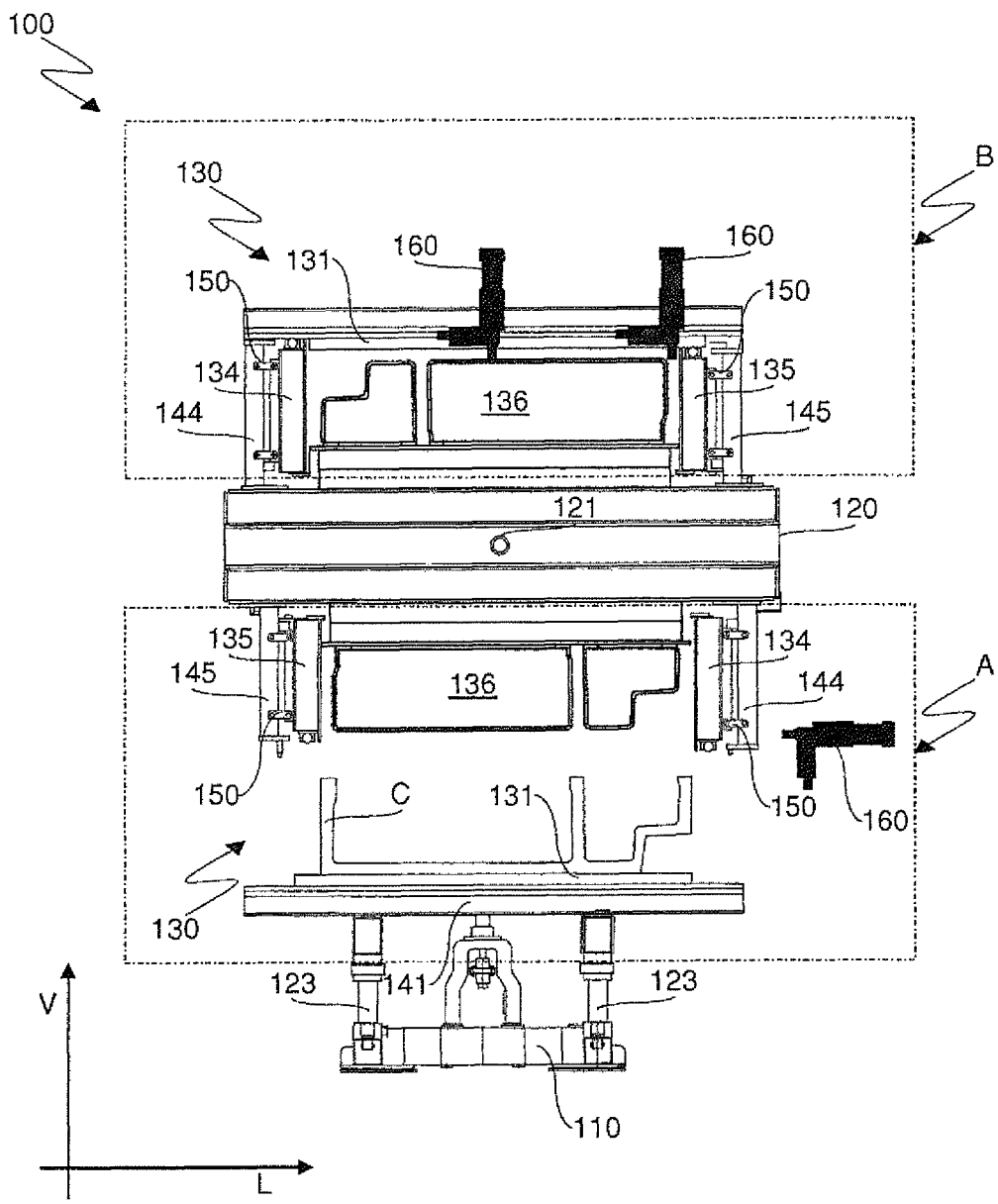
FIGS. 3 to 6 are side views schematically showing subsequent processing steps of a refrigerator cabinet by the foaming apparatus of the invention.

As shown in FIG. 3, a refrigerator cabinet C to be processed is received in a bath configuration, i.e. with the cavity of the inner shell facing upwards in the vertical direction V, from a supply line (not shown), e.g. along the longitudinal direction L, and loaded on the bottom wall 131 of the jig 130.

The cabinet C is preferably supplied from a heating station (not shown) wherein it is heated at a temperature up to about 70° C. so as to promote the foaming process.

Figure 4:
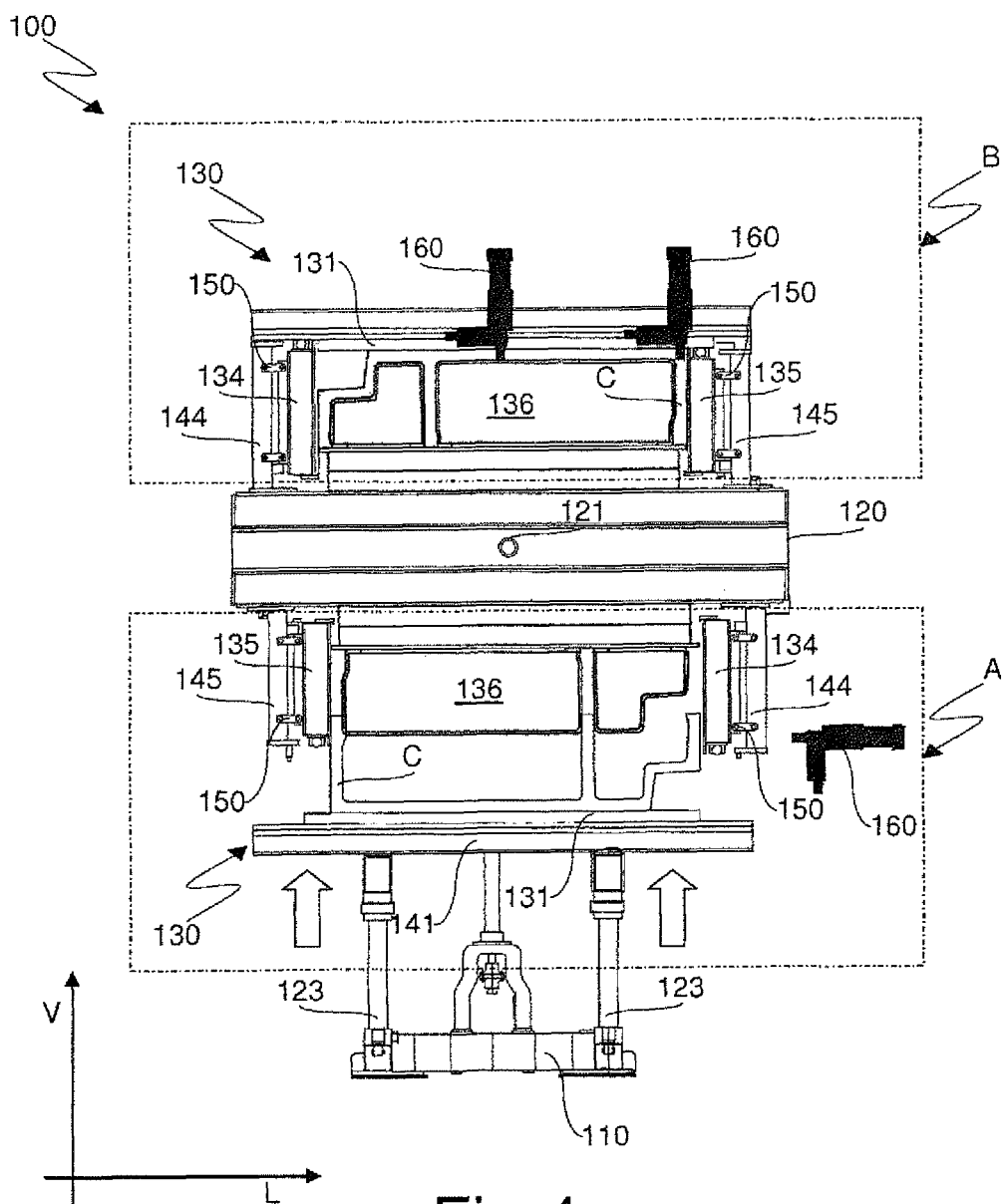

As shown in FIG. 4, by driving the movable plate 141, the bottom wall 131 is then brought back in contact with the peripheral walls 132, 133, 134, 135 of the jig 130 and fixed thereto by way of any known fastening means such as e.g. bolts, so as to achieve the closed configuration shown in FIGS. 1 and 2. During this step the plug 136 is progressively fitted into the inner shell of the cabinet C, so that when the jig 130 is closed the inner and outer shells of the cabinet C completely contact the peripheral walls 132, 133, 134, 135 and the plug 136.

By rotating the shaft 121 by 180° the same steps may be carried out so as to load another refrigerator cabinet C in the second jig 130. FIG. 4 schematically shows a first and a second refrigerator cabinets respectively loaded in the first and second jigs 130.

In order to allow to adjust the size of the jig 130 according to the outer size of the cabinet C to be processed, the peripheral walls 132, 133, 134, 135 are preferably restrained to the supporting structure 121 by way of respective mounts 142, 143, 144, 145 and are movable relative thereto by means of connecting links 150 and related actuators (not shown).

The shape of the plug 136 instead strictly depends on the specific shape of the inner shell of the cabinet C to be processed and cannot be adjusted.

According to the present invention, every jig 130 of the foaming apparatus 100 also comprises one or more injection heads 160 configured to carry out injection of a foaming mixture.

Figure 5:
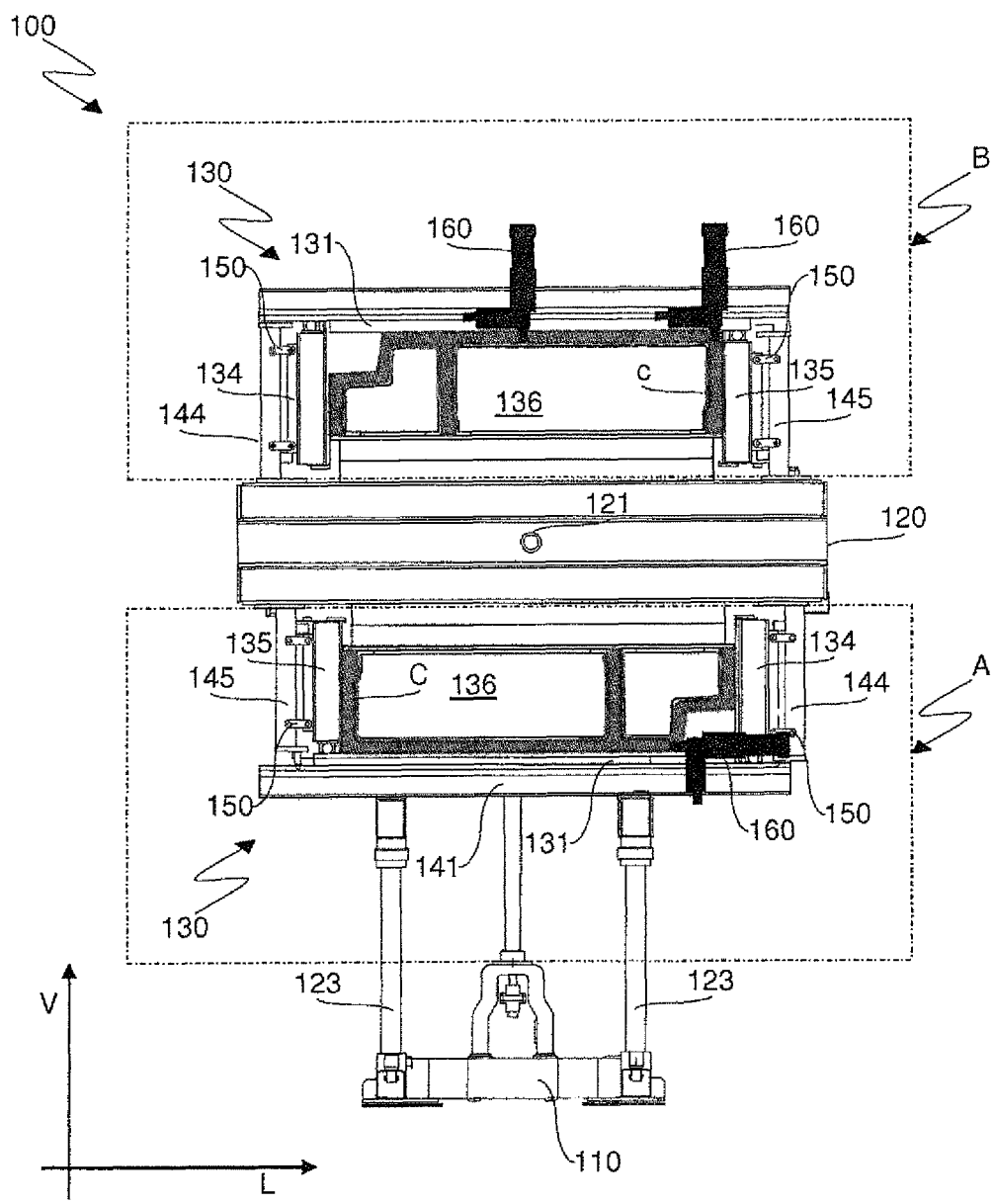
Figure 6:
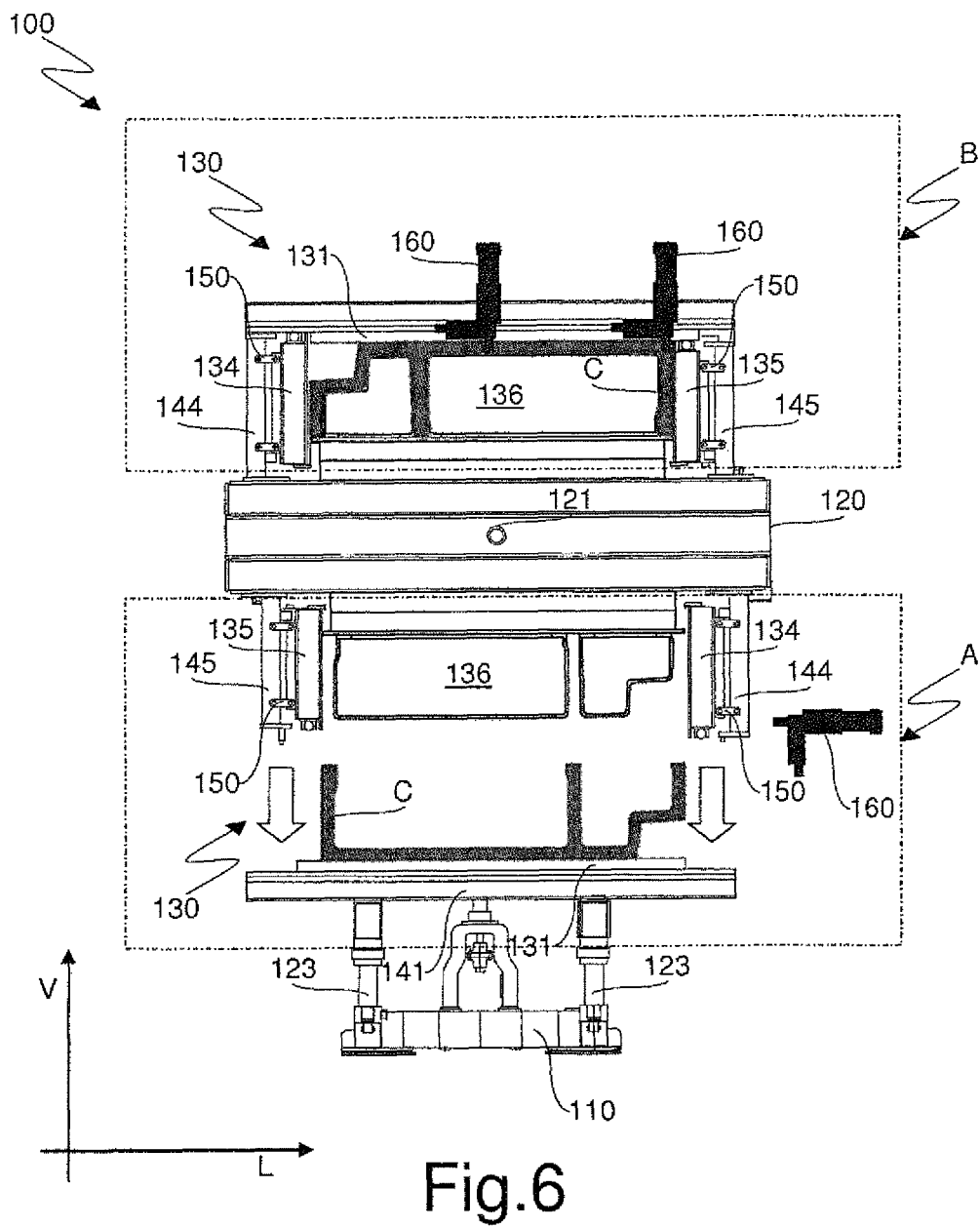

The injection heads 160 are associated to the bottom wall 131 of each jig 130 and may be advantageously removably restrained to the bottom wall 131 so as to ease opening and closing of the jig 130 when loading and uploading a refrigerator cabinet C, as schematically shown in FIGS. 3, 4 and 6. As schematically shown in FIG. 5, in an operating condition the injection heads 160 are instead suitably restrained to the bottom wall 131 respective jig 130, thus allowing to carry out injection of a foaming mixture into the cavity of a refrigerator cabinet C.

In the jight of the above, it is clear that the lower position A of the apparatus defines a "bath configuration" for the foaming of a cabinet, whereas in the upper position B a jig is rotated by 180° and defines a "bell configuration".

Hence, according to the position of a jig 130, injection of a foaming mixture may be carried out either in a bath configuration when a jig 130 is in the lower position A, or in a bell configuration when a jig 130 is in the upper position B.

In other words, the foaming apparatus of the invention comprises two independent foaming stations having respective jigs and injection heads allowing to process refrigerator cabinets either in a bath configuration or in a bell configuration according to their specific manufacturing needs.

Processing of refrigerator cabinets, i.e. injecting and curing of a foaming mixture, may be carried out in either foaming station and even occur simultaneously in the two foaming stations as shown in FIG. 5, thus allowing to optimize processing times and manufacturing costs.

Processing of different types of refrigerator cabinets is also advantageously possible.

Injection of the foaming mixture is carried out according to prior art techniques by progressively filling the cavity defined by outer and inner shells of the cabinet. Air present inside the cavity is progressively pushed by the foaming mixture during the injection step and vented through the gaps that are typically present between the inner and outer shells. No injection under vacuum conditions as described in the above mentioned publication US 2008/0029921 A1 is carried out, this process being considered too much expensive due to the related equipment and additional structures surrounding the jigs. Moreover, vacuum injection requires use of specific types of foaming mixtures, whereas no restrictions on the foaming mixture type exist if injection is carried out at ambient pressure. Furthermore, the gaps typically present between the inner and outer shells of a refrigerator cabinet allow to vent air effectively without negatively affecting filling of the cavity by the foaming mixture.

The jigs 130 may be advantageously inclined about an horizontal axis when injecting the foaming mixture or immediately before it so as to facilitate filling of the cavity. Inclination of the jig is maintained during the whole injection step. Depending on the type of foaming mixture and the shape of the cavity to be filled, the foaming stations may be inclined e.g. up to approximately 30° relative to a horizontal plane, i.e. a plane parallel to the base 110 of the apparatus 100.

The jigs may e.g. be inclined about the axis Z of the shaft 121 to which the jigs are restrained.

The bottom and peripheral walls 131, 132, 133, 134, 135 of each jig 130 are preferably thermoregulated so as to maintain the cabinet to be treated e.g. at a temperature up to about 70° C. and promote and accelerate curing of the injected foaming mixture.

As shown in FIG. 5, when the curing step following the injection step is finished, each jig 130 is brought at the lower position A by rotating the shaft 121 and opened by removing the bottom wall 131. To this aim, the movable platform 141 is again driven in contact with the bottom wall 131, the latter is disengaged from the peripheral walls 132, 133, 134, 135, the injection head or heads 160 are separated from the bottom wall 131 and the latter is lowered together with the finished cabinet C. The finished cabinet C is then moved to an unloading station (not shown) along e.g. the longitudinal direction L.

Transfer of refrigerator cabinets to and from the foaming apparatus may be carried out in any suitable way. For example, it is possible to employ motor-driven trolleys guided along rails e.g. extending in the longitudinal direction L and provided with respective gripping means, e.g. suction caps.

Figure 7:
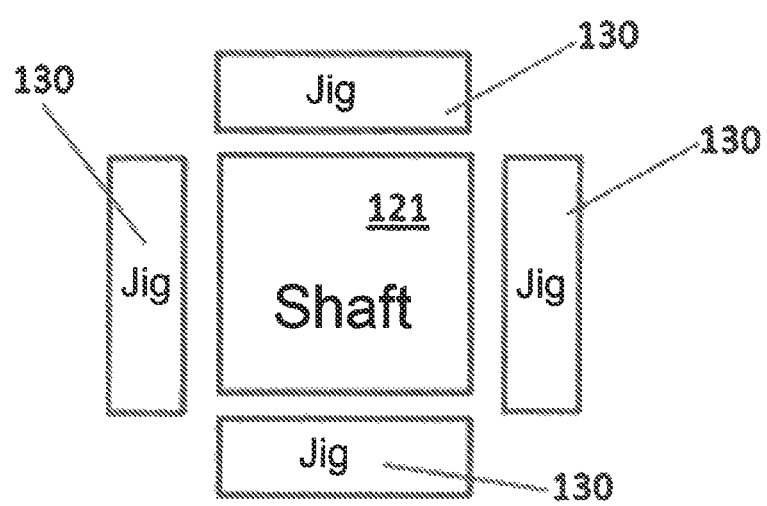
FIG. 7 shows a further configuration with four jigs.

According to another embodiment of the invention, the apparatus shown in FIG. 7 may comprise further jigs of the type described above, i.e. provided with respective injection heads, restrained to the rotatable shaft 121, e.g. a third and a fourth jigs 130 like those described above, arranged opposite to each other relative to the latter and angularly spaced, e.g. by approximately 90°, relative to the first and second jigs 130 shown in the drawings.

Provided that the injection step in each jig 130 is carried out at the lower and/or upper position A, B, i.e. in a bath or bell configuration as described above so as to optimize filling of the cabinet cavity, the injected foaming mixture can be left curing by bringing the jigs 130 in a different position, e.g. at intermediate positions rotated by 90°, so as to allow to carry out additional injection steps of further refrigerator cabinets in the lower and upper positions A, B, respectively. Curing of foaming mixture injected in a jig may thus occur parallel to injection steps carried in another jig, thus further allowing to optimize processing time and manufacturing costs.

According to still another embodiment of the invention, the foaming apparatus of the invention may be configured so as to allow opening and closing of a jig not only in the lower position but also in the upper position. To this aim, the apparatus may comprise a further movable platform restrained to further mounts of the frame extending in the vertical direction V above the supporting structure of the jigs. Further motor-driven trolleys and respective rails may be provided in addition to those described above so as to provide the apparatus with independent lines for loading and unloading refrigerator cabinets at each foaming station.

According to this embodiment of the invention, when only a first and a second jigs are employed, their rotation about an horizontal axis is not strictly necessary, there being respective loading and unloading locations at the lower and upper positions A, B. Hence, in this case the supporting structure may be a fixed structure such as e.g. a beam.

In a configuration of the foaming apparatus comprising more than two foaming jigs as e.g. described above, use of a rotatable supporting structure is instead necessary so as to allow to bring every jig to either the lower or the upper positions A, B.

The invention has been disclosed with reference to preferred embodiments thereof. It is understood that further embodiments of the invention may exist relating to the inventive idea as set forth in the appended claims.

The invention claimed is:

1. A foaming apparatus for processing refrigerator cabinets, said foaming apparatus comprising:
   a frame comprising a supporting structure;
   first and second independent foaming stations each comprising a respective one of first and second foaming jigs which are restrained to the supporting structure opposite to each other relative to the supporting structure, said first and second foaming jigs being respectively arranged in a lower position and in an upper position relative to a vertical direction of the foaming apparatus in an operating condition thereof;

wherein each of said first and second foaming jigs comprises a bottom wall, peripheral walls configured to enclose an outer shell of the refrigerator cabinet, a plug configured to engage an inner shell of the refrigerator cabinet, and at least one injection head configured to carry out injection of a foaming mixture into the refrigerator cabinet received therein, wherein the peripheral walls and the plug are restrained to the supporting structure, wherein the bottom wall is removably mounted to the peripheral walls.

2. The foaming apparatus of claim 1, wherein each injection head is associated or removably restrained to the bottom wall of the respective foaming jig.

3. The foaming apparatus of claim 1, wherein the supporting structure is a rotatable shaft which is restrained to the frame so as to rotate about a horizontal axis.

4. The foaming apparatus of claim 1, further comprising a base, and a platform arranged between the one of the first and second foaming jigs that is arranged in the lower position and the base, said platform being movable relative to the base and the one of the first and second foaming jigs along the vertical direction.

5. The foaming apparatus of claim 4, wherein the frame includes a plurality of mounts stretching out from the base in the vertical direction and configured to restrain the platform.

6. The foaming apparatus of claim 1, wherein the peripheral walls of each of the first and second foaming jigs are restrained to the supporting structure by mounts and movable relative to the supporting structure via connecting links and related actuators.

7. The foaming apparatus of claim 1, wherein the bottom and peripheral walls of each of the first and second foaming jigs are thermoregulated.

8. The foaming apparatus of claim 1, further comprising third and fourth foaming jigs restrained to the supporting structure opposite to each other and angularly spaced apart relative to the first and second foaming jigs, said supporting structure being a rotatable shaft.

9. The foaming apparatus of claim 8, wherein the third and fourth foaming jigs are angularly spaced by approximately 90°.

10. The foaming apparatus of claim 1, wherein one of the first and second independent foaming stations defines a bath configuration and the other one of the first and second independent foaming stations defines a bell configuration.

11. The foaming apparatus of claim 1, wherein the processing of refrigerator cabinets is carried out in either of the first and second independent foaming station or simultaneously in the first and second independent foaming stations.

12. The foaming apparatus of claim 8, wherein the third and fourth foaming jigs are provided with respective injection heads.

\* \* \* \* \*